US009723647B2

United States Patent
Yu et al.

(10) Patent No.: US 9,723,647 B2
(45) Date of Patent: Aug. 1, 2017

(54) HANDLING A RADIO LINK FAILURE IN COMMUNICATIONS

(71) Applicant: NOKIA SOLUTIONS AND NETWORKS OY, Espoo (FI)

(72) Inventors: Ling Yu, Oulu (FI); Vinh Van Phan, Oulu (FI); Kari Veikko Horneman, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 186 days.

(21) Appl. No.: 14/763,053

(22) PCT Filed: Feb. 1, 2013

(86) PCT No.: PCT/EP2013/051981
§ 371 (c)(1),
(2) Date: Jul. 23, 2015

(87) PCT Pub. No.: WO2014/117854
PCT Pub. Date: Aug. 7, 2014

(65) Prior Publication Data
US 2015/0365994 A1  Dec. 17, 2015

(51) Int. Cl.
*H04W 76/04* (2009.01)
*H04W 76/02* (2009.01)
(Continued)

(52) U.S. Cl.
CPC ..... *H04W 76/027* (2013.01); *H04W 72/1268* (2013.01); *H04W 76/028* (2013.01);
(Continued)

(58) Field of Classification Search
CPC ............. H04W 76/027; H04W 76/048; H04W 72/1268; H04W 76/028; H04W 76/043; H04W 88/04
See application file for complete search history.

(56) References Cited

U.S. PATENT DOCUMENTS

2008/0076404 A1*  3/2008  Jen ...................... H04W 76/028
                                                    455/423
2009/0196168 A1    8/2009  Aydin et al.
(Continued)

FOREIGN PATENT DOCUMENTS

CN    WO 2011/088609    *  7/2011  ............ H04W 72/00
EP    WO 2011/141313    *  11/2011  ............ H04W 36/00
(Continued)

OTHER PUBLICATIONS

R2-072382; Nokia Siemens Networks, et al.; "Radio Link Failure Recovery"; 3GPP TSG-RAN WG2 Meeting #58; Orlando, USA, Jun. 25-29, 2007.
(Continued)

*Primary Examiner* — Edan Orgad
*Assistant Examiner* — Ivan O Latorre
(74) *Attorney, Agent, or Firm* — Brake Hughes Bellermann LLP

(57) ABSTRACT

A method for a communications system, wherein in response to detecting a radio link problem during a first phase of a radio link failure, the first user terminal transmits an indication of the detection of the radio link problem to a second user terminal over a device-to-device link. In response to a report on the radio link problem detection of the first user terminal being sent from the second user terminal to a network apparatus, the first user terminal receives a confirmation on a status of the report from the second user terminal over the device-to-device link. Based on the confirmation, the first user terminal decides, whether to stop a first radio link failure timer, reset the first radio link failure timer, or extend the first radio link failure timer.

19 Claims, 7 Drawing Sheets

(51) Int. Cl.
*H04W 72/12* (2009.01)
*H04W 88/04* (2009.01)

(52) U.S. Cl.
CPC ....... *H04W 76/043* (2013.01); *H04W 76/048* (2013.01); *H04W 88/04* (2013.01)

(56) References Cited

U.S. PATENT DOCUMENTS

| | | | |
|---|---|---|---|
| 2010/0240357 A1* | 9/2010 | Wu | H04W 24/00 455/424 |
| 2011/0183663 A1 | 7/2011 | Kenehan et al. | |
| 2012/0088498 A1* | 4/2012 | Xiao | H04W 24/02 455/424 |
| 2012/0142336 A1* | 6/2012 | Van Phan | H04W 36/0033 455/423 |
| 2012/0224470 A1* | 9/2012 | Jeong | H04W 36/08 370/221 |
| 2013/0223307 A1* | 8/2013 | Ohlsson | H04W 52/0216 370/311 |
| 2014/0171062 A1* | 6/2014 | Fallgren | H04W 40/22 455/422.1 |
| 2014/0198672 A1* | 7/2014 | Koo | H04W 72/1215 370/252 |
| 2014/0349694 A1* | 11/2014 | Raghothaman | H04W 36/00 455/509 |
| 2015/0099511 A1* | 4/2015 | Lindoff | H04W 76/023 455/426.1 |
| 2015/0250011 A1* | 9/2015 | Lindoff | H04W 76/023 370/225 |

FOREIGN PATENT DOCUMENTS

| | | | | |
|---|---|---|---|---|
| EP | WO 2011/147462 | * | 12/2011 | ............ H04W 76/02 |
| EP | WO 2012/130309 | * | 10/2012 | ............ H04W 24/02 |
| WO | 2012/129806 A1 | | 10/2012 | |

OTHER PUBLICATIONS

3GPP TS 36.300 V11.4.0 (Dec. 2012); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11).

International Search Report and Written Opinion for International Application No. PCT/EP2013/051981, mailed Oct. 11, 2013, 14 pages.

* cited by examiner

HANDLING A RADIO LINK FAILURE IN COMMUNICATIONS

This application is a national stage entry of PCT Application No. PCT/EP2013/051981, filed on Feb. 1, 2013, entitled "HANDLING A RADIO LINK FAILURE IN COMMUNICATIONS", which is hereby incorporated by reference in its entirety.

FIELD OF THE INVENTION

The exemplary and non-limiting embodiments of this invention relate generally to wireless communications networks, and more particularly to handling of a radio link failure.

BACKGROUND ART

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Radio link failure (RLF) is a common phenomenon in radio access networks when a radio channel signal strength is too weak to continue with an application. Radio link failure is a local event detected by the user equipment immediately, and network nodes find out about it later. Hence, radio link failure is usually dealt locally by the user equipment. In case of radio link failure, release of signalling resources leads to discontinuation of the application.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Various aspects of the invention comprise a method, apparatuses, a computer program product, and a computer-readable storage medium as defined in the independent claims. Further embodiments of the invention are disclosed in the dependent claims.

An aspect of the invention relates to a method for handling a radio link failure in a communications system, the method comprising in response to detecting, in a first user terminal, a radio link problem during a first phase of a radio link failure, transmitting an indication of a detection of the radio link problem from the first user terminal to a second user terminal over a device-to-device link; receiving, in the first user terminal from the second user terminal over the device-to-device link, a confirmation on a status of a report on the radio link problem detection of the first user terminal, the report being sent from the second user terminal to a network apparatus, the confirmation on the status of the report being based on an acknowledgement sent by the network apparatus to the second user terminal; based on the confirmation, deciding in the first user terminal whether to stop a first radio link failure timer, reset the first radio link failure timer or extend the first radio link failure timer; wherein the method further comprises indicating a selected cell to the network apparatus in order the network to be able to prepare the selected cell for first user terminal's access, wherein when the first user terminal selects a cell of a different network apparatus after the radio failure is detected, the first user terminal indicates to the network via the second user terminal a cell identifier of the selected cell and the cell serving the first user terminal before the radio link failure happens; recovering the first user terminal from the radio link failure, wherein activity is resumed in the first user terminal by requesting RRC connection re-establishment to the selected cell without going via an RRC_IDLE mode.

A further aspect of the invention relates to a first user terminal comprising at least one processor; and at least one memory including a computer program code, wherein the at least one memory and the computer program code are configured to, with the at least one processor, cause the first user terminal to transmit, in response to detecting a radio link problem during a first phase of a radio link failure, an indication of a detection of the radio link problem to a second user terminal over a device-to-device link; receive, from the second user terminal over the device-to-device link, a confirmation on a status of a report on the radio link problem detection of the first user terminal, the report being sent from the second user terminal to a network apparatus, the confirmation on the status of the report being based on an acknowledgement sent by the network apparatus to the second user terminal; decide, based on the confirmation, whether to stop a first radio link failure timer, reset the first radio link failure timer or extend the first radio link failure timer; wherein the at least one memory and the computer program code are further configured to, with the at least one processor, cause the first user terminal to indicate a selected cell to the network apparatus in order the network to be able to prepare the selected cell for first user terminal's access, wherein when the first user terminal selects a cell of a different network apparatus after the radio failure is detected, the first user terminal indicates to the network via the second user terminal a cell identifier of the selected cell and the cell serving the first user terminal before the radio link failure happens; recover from the radio link failure, wherein activity is resumed in the first user terminal by requesting RRC connection re-establishment to the selected cell without going via an RRC_IDLE mode.

A still further aspect of the invention relates to a second user terminal comprising at least one processor; and at least one memory including a computer program code, wherein the at least one memory and the computer program code are configured to, with the at least one processor, cause the second user terminal to receive an indication of a detection of the radio link problem from the first user terminal over a device-to-device link, the indication indicating a radio link problem detected in the first user terminal during a first phase of a radio link failure; transmit, to a network apparatus, a report on the radio link problem detection of the first user terminal, in order the network apparatus to be able to proactively reduce the impact caused by the radio link problem of the first user terminal; transmit, in response to the network apparatus acknowledging the report on the radio link problem detection of the first user terminal, a confirmation on a status of the report to the first user terminal in order the first user terminal to be able to decide, based on the confirmation, whether to stop a first radio link failure timer, reset the first radio link failure timer or extend the first radio link failure timer; wherein the at least one memory and the computer program code are further configured to, with the at least one processor, cause the second user terminal to indicate to the network apparatus a selected cell so that the network is able to prepare the selected cell for the first user terminal's access in order for the first user terminal to be able to recover from radio link failure and resume activity by requesting RRC connection re-establishment to the selected cell without going via a RRC_IDLE mode.

A still further aspect of the invention relates to an apparatus comprising at least one processor; and at least one memory including a computer program code, wherein the at least one memory and the computer program code are configured to, with the at least one processor, cause the apparatus to receive, from a second user terminal, a report on the radio link problem detection of the first user terminal during a first phase of a radio link failure; proactively reduce the impact caused by the radio link problem of the first user terminal by stopping link scheduling for the first user terminal before radio problem recovery is detected or indicated, and/or by utilizing a device-to-device link for the first user terminal via the second user terminal for providing a temporary or alternative radio connection for the first user terminal.

A still further aspect of the invention relates to a computer program product comprising program code means configured to perform any of the method steps when the program is run on a computer.

A still further aspect of the invention relates to a computer-readable storage medium comprising program code means configured to perform any of the method steps when executed on a computer.

Although the various aspects, embodiments and features of the invention are recited independently, it should be appreciated that all combinations of the various aspects, embodiments and features of the invention are possible and within the scope of the present invention as claimed.

BRIEF DESCRIPTION OF THE DRAWINGS

In the following the invention will be described in greater detail by means of exemplary embodiments with reference to the attached drawings, in which.

DETAILED DESCRIPTION OF SOME EMBODIMENTS

An exemplary embodiment is targeted for device-to-device (D2D) communications in proximity services (ProSe) considered as a potential feature candidate for 3GPP LTE-A Rel-12 and beyond. In particular, an exemplary embodiment is related to the handling and recovering of cellular radio link failure (RLF) for UEs that have a D2D connection with other UEs.

In a regular cellular network, a radio link problem is detected independently in UE and network side as the report of the problem cannot be made between UE and network when the problem happens on the radio link. However, the independent detection of the problem on the radio link may result in waste of radio resources. For example, when UE is suffering from a radio problem in DL, but the network does not know that, eNB may still continue scheduling UE several times until it detects the radio problem after no response is received from UE for several times.

If a D2D link is available for UE that is suffering from a direct radio link problem towards the network, the D2D peer UE may be utilized to make contact with the network for some optimization and enhancement on the handling and recovery of radio link failure. An exemplary embodiment considers optimizing and enhancing the cellular radio link failure handling and recovery in case of an available D2D link.

Figure 1:
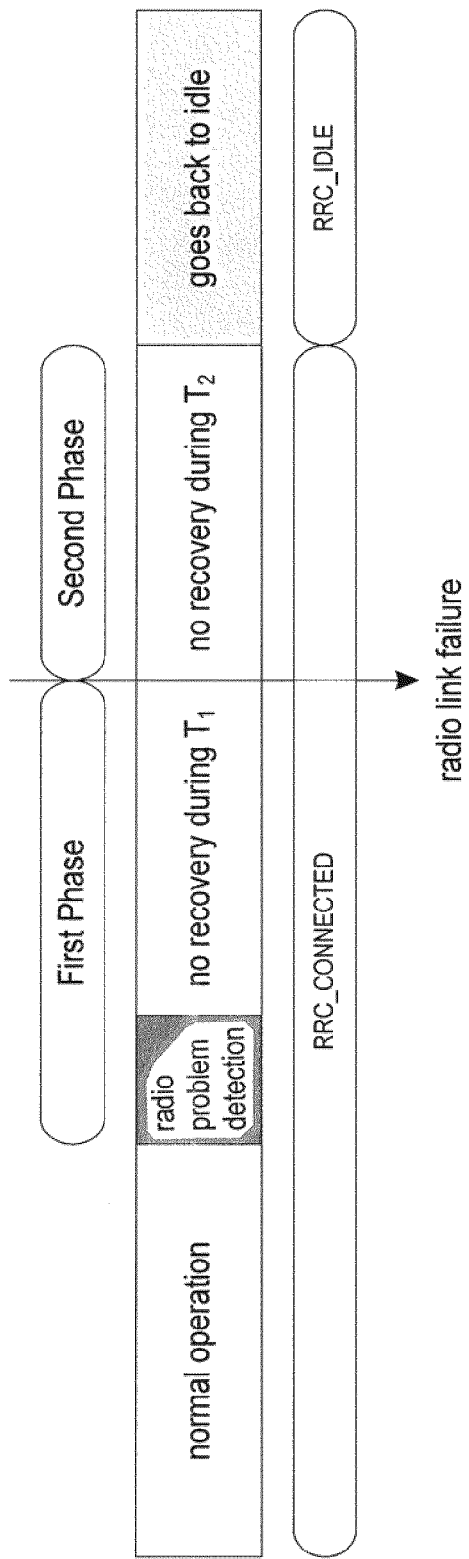
FIG. 1 illustrates phases of a radio link failure.

RLF handling in regular E-UTRAN cellular access may be described as follows. Two phases govern the behaviour associated to radio link failure as shown in FIG. 1. The first phase is started upon radio problem detection, and leads to radio link failure detection, no UE-based mobility is applied, and it is based on timer or other (e.g. counting) criteria (T1). The second phase is started upon radio link failure detection or handover failure, and leads to an RRC_IDLE mode, UE-based mobility is applied, and it is timer based (T2). Table 1 below describes how mobility is handled with respect to radio link failure.

TABLE 1

Mobility and radio link failure

| Cases | First phase | Second phase | T2 expired |
|---|---|---|---|
| UE returns to the same cell | Continue as if no radio problems occurred | Activity is resumed by means of explicit signalling between UE and eNB | Go via RRC_IDLE |
| UE selects a different cell from the same eNB | N/A | Activity is resumed by means of explicit signalling between UE and eNB | Go via RRC_IDLE |
| UE selects a cell of a prepared eNB (NOTE) | N/A | Activity is resumed by means of explicit signalling between UE and eNB | Go via RRC_IDLE |
| UE selects a cell of a different eNB that is not prepared (NOTE) | N/A | Go via RRC_IDLE | Go via RRC_IDLE |

(NOTE):
a prepared eNB is eNB which has admitted UE during an earlier executed HO preparation phase In the second phase, in order to resume activity and avoid going via the RRC_IDLE mode when UE returns to the same cell or when UE selects a different cell from the same eNB, or when UE selects a cell from a different eNB, the following procedure applies: UE stays in a RRC_CONNECTED mode; UE accesses the cell through a random access procedure; a UE identifier used in the random access procedure for contention resolution (i.e. C-RNTI of UE in the cell where RLF occurred+physical layer identity of that cell+short MAC-I based on the keys of that cell) is used by the selected eNB to authenticate UE and check whether it has a context stored for that UE: a) if eNB finds a context that matches the identity of UE, it indicates to UE that its connection can be resumed, b) if the context is not found, RRC connection is released and UE initiates a procedure to establish a new RRC connection (in this case UE is required to go via the RRC_IDLE mode).

Regarding the radio link failure in the scenario of D2D based mobile relay in which a relayed UE is out of the cellular network coverage, a RRC state timer of the relayed UE may be suspended when a relaying UE detects RLF and requests RRC connection re-establishment. However, that approach only considers the scenario in which the relayed UE is out of the cellular network coverage, without further optimization and enhancement based on the relayed UE assistant.

An exemplary embodiment relates to handling radio link failure on a cellular link for UEs having a D2D connection. A scenario is considered where a first user terminal UE1 is suffering from a problem on the cellular radio link while a D2D link (either for direct end-to-end communication or D2D mobile relay based cellular access) between UE1 and a second user terminal UE2 still works properly. In order to have faster and more robust synchronization of the radio link problem/failure detection between UE1 and a network apparatus eNB as well as RLF recovery utilizing the D2D link between UE1 and UE2, the optimization and enhancement methods and signalling mechanism for RLF handling and recovery are proposed in the following.

RLF Handling Optimization During the First Phase of RLF

UE1 may indicate the detection of a radio problem to UE2 over the D2D link when UE1 detects the problem during the first phase of RLF. In addition to the radio problem detection indication, UE1 may also indicate to UE2, over the D2D link, a C-RNTI identifier of UE1, a DRX configuration and UL timing advance information, so that UE2 may monitor the scheduling information and eventually make UL transmission on scheduled UL resources (as proposed below) using the timing advance information of UE1 if UE2 doesn't have UL synchronization to eNB.

UE2 may be configured to report the radio problem detection (RLF) of UE1 to eNB, so that eNB may proactively reduce the impact caused by the radio problem of UE1, e.g. by stopping further UL/DL scheduling for UE1 if radio problem recovery is not detected or indicated or by utilizing UE2 and D2D connection for providing temporary or alternative radio access connection for UE1. If UE2 already has the direct radio link towards the eNB, it may use its own connection to report the radio link problem of UE1. Or as another option, UE2 may also monitor scheduling information of UE1 and report the radio link problem of UE1 on the scheduled UL resource if UL scheduling information targeted to UE1 is detected. The latter option is more preferable when UE2 is in a long DRX status, so that the radio problem may be reported to eNB as early as possible. If UE2 does not have a direct radio link towards eNB (e.g. UE2 access to the cellular network via D2D based mobile relay by UE1 when the radio problem is detected), UE2 may monitor the scheduling information of UE1 and report the radio problem detection of UE1 to eNB on the scheduled UL resources using the timing advance information of UE1 if UL scheduling information for UE1 is detected.

UE2 confirms to UE1 over the D2D link on the status of the radio link problem report, the possible quick recovery of the radio link problem during the first phase, and therefore UE1 may be configured to stop, reset or extend T1. UE2 may confirm to UE1 over the D2D link whether the report on the radio link problem is successful or not. If eNB configures to use UE2's direct radio link to provide an alternative radio connection to UE1 as part of a quick RLF recovery within T1, UE2 may also confirm this to UE1 together with the report status. In this case, UE1 may be configured (either semi-statically based on preconfigured rules or dynamically) to stop T1 if the alternative radio connection to UE1 via UE2's direct radio link is configured, or reset/extend T1 if eNB only configures to provide a temporary radio connection to UE1 via UE2 e.g. by allowing UE2 to monitor UE1's scheduling information and transmitting/receiving UE1's data to/from eNB on the scheduled resources of UE1. If UE1 is configured to stop the T1 timer, no radio link failure is detected by UE1. In this case, the following enhancement of RLF recovery may not be needed.

Enhancement of RLF Recovery During the Second Phase of RLF

UE1 may be configured to extend the RLF recovery timer (e.g. T2 in FIG. 1) if the D2D link is available for assisting RLF recovery when UE1 detects RLF. If UE2 has a direct radio link towards eNB, RLF of UE1 may be reported to eNB by UE2, and the RLF recovery timer extension may be dynamically configured by eNB and communicated to UE1 via UE2. Or as another alternative, the recovery timer extension may be autonomously executed by UE1 based on pre-configured rules from the network. As an example, a recovery timer extension rule may be configured as follows: a) If UE1 has user plane traffic over a direct D2D link and the control plane connection towards eNB is only for network controlled D2D operation, the RLF recovery timer may be extended till the time when next control command/request from/to the network is expected. b) If eNB configured that at least some of UE1's traffic (e.g. control plane traffic and delay sensitive user plane traffic) may be temporarily relayed via UE2 when UE1 detects RLF, then in this case, the RLF recovery timer may be extended for some time interval or restarted for certain number of times until reaching the configured maximum limit. c) If UE1 was relaying UE2's traffic to/from eNB by D2D based mobile relay access before RLF is detected and eNB may configure to switch the relaying role to allow UE2 relaying UE1's traffic to/from eNB, the RLF recovery timer may be configured to stop when UE1 has established the access link to eNB via UE2.

UE2 may assist UE1 for indicating the selected cell to eNB so that the network side is able to prepare the selected cell for UE1's access. As indicated on the fourth row of Table 1 when UE1 selects a cell of a different eNB that is not prepared after RLF is detected, UE1 indicates to the network via UE2 the cell IDs of the selected cell and the serving cell before RLF happens. Then the previous serving cell may transfer the UE context of UE1 to the selected cell via a network interface (e.g. X2/S1 interface in LTE). Thus the selected cell becomes the prepared one, and UE1 is able to recover from RLF and resume activity by requesting RRC connection re-establishment to the selected cell without going via the RRC_IDLE mode.

Exemplary embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Like reference numerals refer to like elements throughout.

The present invention is applicable to any user terminal, server, corresponding component, and/or to any communication system or any combination of different communication systems that support RLF handling. The communication system may be a fixed communication system or a wireless communication system or a communication system utilizing both fixed networks and wireless networks. The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, the embodiment.

In the following, different embodiments will be described using, as an example of a system architecture whereto the embodiments may be applied, an architecture based on LTE-A network elements, without restricting the embodiment to such an architecture, however. The embodiments described in these examples are not limited to the LTE radio systems but can also be implemented in other radio systems, such as UMTS (universal mobile telecommunications system), GSM, EDGE, WCDMA, bluetooth network, WLAN or other fixed, mobile or wireless network. In an embodiment, the presented solution may be applied between elements belonging to different but compatible systems such as LTE and UMTS.

Figure 2:
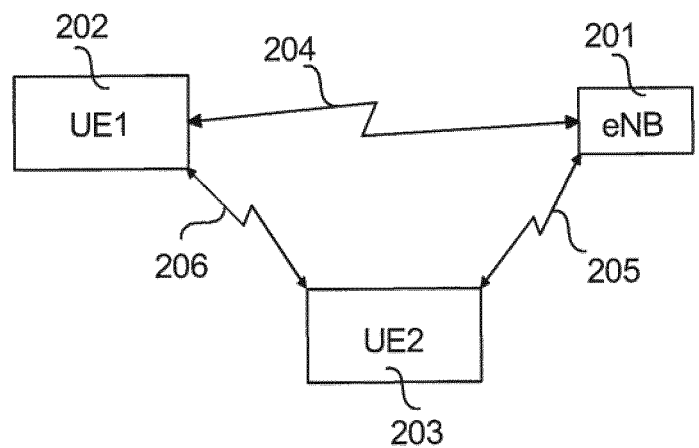
FIG. 2 shows a simplified block diagram illustrating exemplary system architecture.

A general architecture of a communication system is illustrated in FIG. 2. FIG. 2 is a simplified system architecture only showing some elements and functional entities, all being logical units whose implementation may differ from what is shown. The connections shown in FIG. 2 are logical connections; the actual physical connections may be different. It is apparent to a person skilled in the art that the systems also comprise other functions and structures. It should be appreciated that the functions, structures, elements and the protocols used in or for RLF handling, are irrelevant to the actual invention. Therefore, they need not to be discussed in more detail here.

The exemplary radio system of FIG. 2 comprises a network node 201 of a network operator. The network node 201 may include e.g. an LTE base station of a macro cell (eNB), radio network controller (RNC), or any other network element, or a combination of network elements. The network node 201 may be connected to one or more core network (CN) elements (not shown in FIG. 2) such as a mobile switching centre (MSC), MSC server (MSS), mobility management entity (MME), gateway GPRS support node (GGSN), serving GPRS support node (SGSN), home location register (HLR), home subscriber server (HSS), visitor location register (VLR). In FIG. 2, the radio network node 201 that may also be called eNB (enhanced node-B, evolved node-B) or network apparatus of the radio system, hosts the functions for radio resource management in a public land mobile network.

FIG. 2 shows one or more user equipment 202, 203 located in the service area of the radio network node 201. The user equipment refers to a portable computing device, and it may also be referred to as a user terminal. Such computing devices include wireless mobile communication devices operating with or without a subscriber identification module (SIM) in hardware or in software, including, but not limited to, the following types of devices: mobile phone, smart-phone, personal digital assistant (PDA), handset, laptop computer. In the example situation of FIG. 2, the user equipment 202 is capable of connecting to the radio network node 201 via a (cellular radio) connection 204. In the example situation of FIG. 2, the user equipment 202 is capable of connecting to the user equipment 203 via a device-to-device connection 206. The user equipment 203 may be capable of connecting to the radio network node 201 via a (cellular radio) connection 205.

Figure 3:
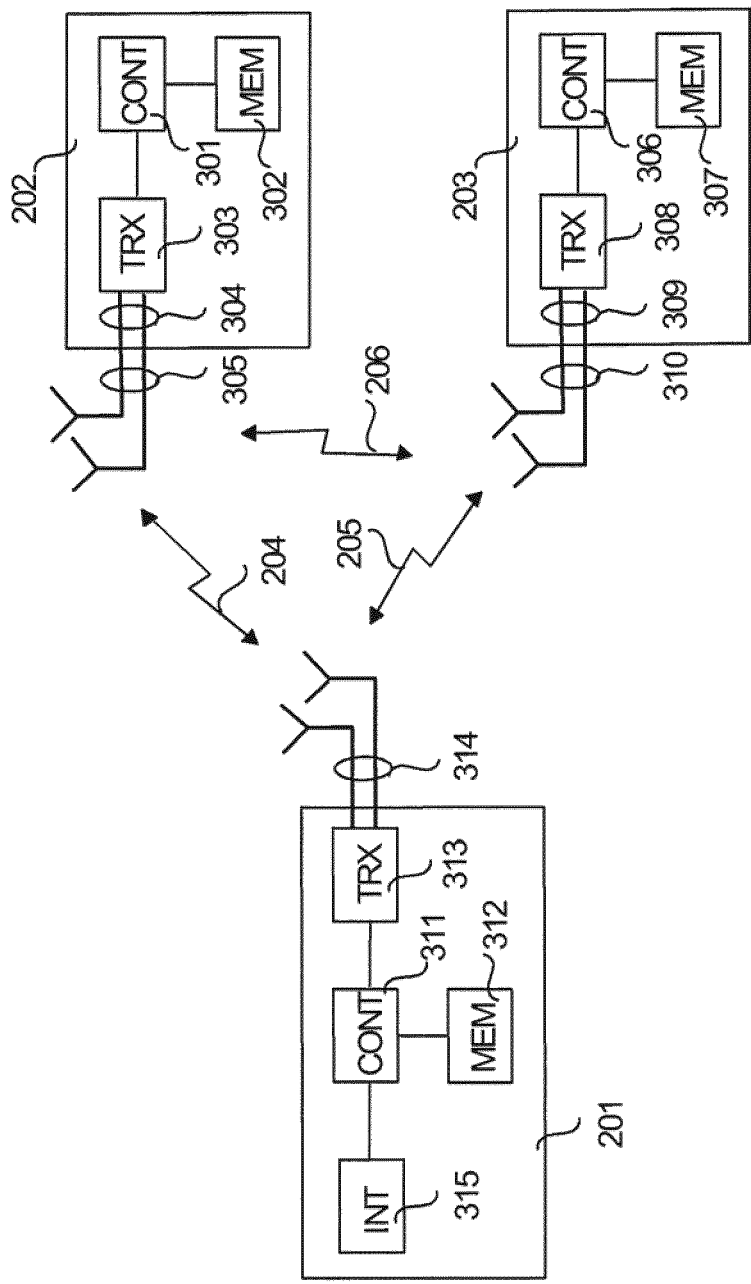
FIG. 3 shows a simplified block diagram illustrating exemplary apparatuses.

FIG. 3 is a block diagram of an apparatus according to an embodiment of the invention. FIG. 3 shows a user equipment 202, 203 located in the area of a radio network node 201. The user equipment 202, 203 is configured to be in connection with the radio network node 201. The user equipment or UE1 202, UE2 203 comprises a controller 301, 306 operationally connected to a memory 302, 307 and a transceiver 303, 308, respectively. The controller 301, 306 controls the operation of the user equipment 202, 203. The memory 302, 307 is configured to store software and data. The transceiver 303, 308 is configured to set up and maintain a wireless connection 204, 205 to the radio network node 201, respectively. The transceiver 303, 308 is operationally connected to a set of antenna ports 304, 309 connected to an antenna arrangement 305, 310. The antenna arrangement 305, 310 may comprise a set of antennas. The number of antennas may be one to four, for example. The number of antennas is not limited to any particular number. The user equipment 202, 203 may also comprise various other components, such as a user interface, camera, and media player. They are not displayed in the figure due to simplicity.

The radio network node 201, such as an LTE (or LTE-A) base station (eNode-B, eNB) comprises a controller 311 operationally connected to a memory 312, and a transceiver 313. The controller 311 controls the operation of the radio network node 201. The memory 312 is configured to store software and data. The transceiver 313 is configured to set up and maintain a wireless connection to the user equipment 202, 203 within the service area of the radio network node 201. The transceiver 313 is operationally connected to an antenna arrangement 314. The antenna arrangement 314 may comprise a set of antennas. The number of antennas may be two to four, for example. The number of antennas is not limited to any particular number. The radio network node 201 may be operationally connected (directly or indirectly) to another network element of the communication system, such as a further radio network node, radio network controller (RNC), a mobility management entity (MME), an MSC server (MSS), a mobile switching centre (MSC), a radio resource management (RRM) node, a gateway GPRS support node, an operations, administrations and maintenance (OAM) node, a home location register (HLR), a visitor location register (VLR), a serving GPRS support node, a gateway, and/or a server, via an interface 315. The embodiments are not, however, restricted to the network given above as an example, but a person skilled in the art may apply the solution to other communication networks provided with the necessary properties. For example, the connections between different network elements may be realized with internet protocol (IP) connections.

Although the apparatus 201, 202, 203 has been depicted as one entity, different modules and memory may be implemented in one or more physical or logical entities. The apparatus may also be a user terminal which is a piece of equipment or a device that associates, or is arranged to associate, the user terminal and its user with a subscription and allows a user to interact with a communications system. The user terminal presents information to the user and allows the user to input information. In other words, the user terminal may be any terminal capable of receiving information from and/or transmitting information to the network, connectable to the network wirelessly or via a fixed connection. Examples of the user terminals include a personal computer, a game console, a laptop (a notebook), a personal digital assistant, a mobile station (mobile phone), a smart phone, and a line telephone.

The apparatus 201, 202, 203 may generally include a processor, controller, control unit or the like connected to a memory and to various interfaces of the apparatus. Generally the processor is a central processing unit, but the processor may be an additional operation processor. The processor may comprise a computer processor, application-specific integrated circuit (ASIC), field-programmable gate array (FPGA), and/or other hardware components that have been programmed in such a way to carry out one or more functions of an embodiment.

The memory 302, 307, 312 may include volatile and/or non-volatile memory and typically stores content, data, or the like. For example, the memory 302, 307, 312 may store computer program code such as software applications (for example for the detector unit and/or for the adjuster unit) or operating systems, information, data, content, or the like for a processor to perform steps associated with operation of the apparatus in accordance with embodiments. The memory may be, for example, random access memory (RAM), a hard drive, or other fixed data memory or storage device. Further, the memory, or part of it, may be removable memory detachably connected to the apparatus.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

Figure 4:
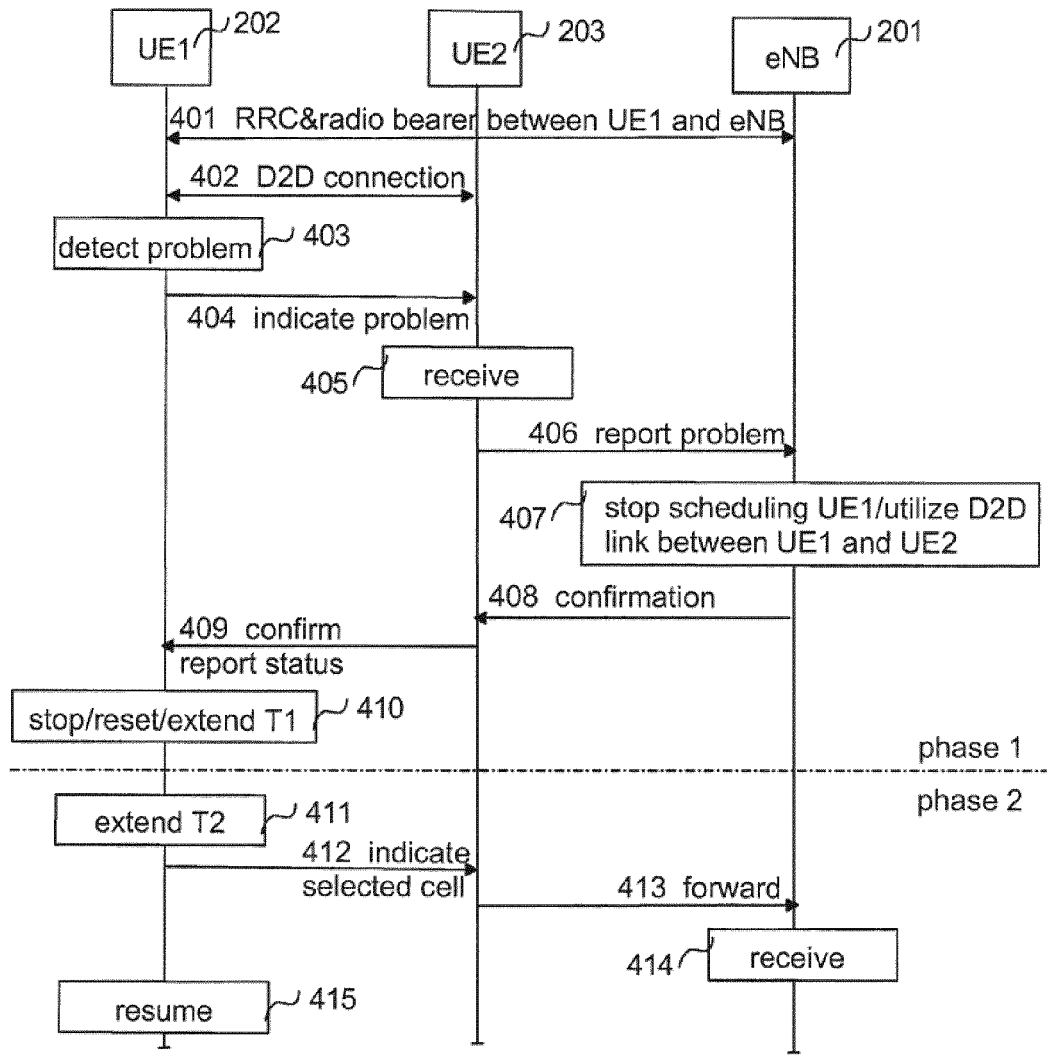
FIG. 4 shows a messaging diagram illustrating an exemplary messaging event according to an embodiment of the invention.

The signalling chart of FIG. 4 illustrates the required signalling. In the example of FIG. 4, a first user terminal UE1 202 may have established RRC and radio bearer with a network node 201 (which may comprise e.g. a LTE-capable base station (enhanced node-B, eNB)) in item 401. In item 402, a device-to-device link may have been established between the first user terminal 202 and a second user terminal UE2 203. In item 403, a cellular radio link problem may be detected in the first user terminal 202. In response to the detecting 403, in the first user terminal, the radio link problem during a first phase of a radio link failure, an indication may be transmitted, in item 404, on the detection of the radio link problem from the first user terminal 202 to the second user terminal 203 over the respective device-to-device link 206. In item 405, the second user terminal 203 may receive the indication of the detection of the radio link problem from the first user terminal 202 over the device-to-device link, the indication indicating a radio link problem detected in the first user terminal 202 during a first phase of a radio link failure. In item 406 the second user terminal 203 may transmit, to the network apparatus 201, a report on the radio link problem detection of the first user terminal, in order the network apparatus 201 to be able to proactively reduce the impact caused by the radio link problem of the first user terminal 202.

In item 407, the network node 201 may receive, from the second user terminal 203, the report on the radio link problem detection of the first user terminal 202 during the first phase of a radio link failure, and based on that, proactively reduce 407 the impact caused by the radio link problem of the first user terminal 202, e.g. by stopping downlink and uplink scheduling for the first user terminal 202, if radio problem recovery is not detected or indicated, and/or by utilizing a device-to-device link 206 via the second user terminal 203 for providing a temporary or alternative radio connection for the first user terminal 202. In item 409, the second user terminal 203 may transmit, after sending the report 406 on the radio link problem detection of the first user terminal 202 to the network apparatus 201 and receiving a response/confirmation 408 from the network apparatus 201, a confirmation 409 on a status of the report to the first user terminal 202 in order the first user terminal 202 to be able to decide, based on the confirmation 409, whether to stop a first radio link failure timer, reset the first radio link failure timer or extend the first radio link failure timer. In item 410, based on the confirmation 409, the first user terminal 202 may decide, whether to stop a first radio link failure timer, reset the first radio link failure timer or extend the first radio link failure timer (and act according to the decision).

In item 411, the first user terminal 202 may extend, during a second phase of a radio link failure, a second radio link failure timer, if a device-to-device link is available for UE1 for assisting radio link failure recovery when the first user terminal 202 detects the radio link failure. In item 412, the first user terminal 202 may indicate a selected cell to the network apparatus 201, via the second user terminal 203, in order the network to be able to prepare the selected cell for first user terminal's access, wherein when the first user terminal 202 selects a cell of a different network apparatus after the radio failure is detected. The first user terminal 202 may indicate to the network, via the second user terminal 203, a cell identifier of the selected cell and a cell identifier of the cell serving the first user terminal 202 before the radio link failure happened. In item 413, the second user terminal 203 may forward the indication 412 to the network apparatus 201, so that the network is able to prepare, in item 414, the selected cell (i.e. a further eNB (not shown in FIG. 4) that controls the selected cell) for the first user terminal's access in order the first user terminal 202 to be able to recover from radio link failure and resume activity by requesting RRC connection re-establishment to the selected cell without going via a RRC_IDLE mode. Thus UE1's context is transferred by eNB 201 to the further eNB, wherein the UE1 context transfer is triggered by the network receiving the selected cell information of UE1 from UE2. In item 415, the first user terminal 202 may recover from the radio link failure, wherein activity is resumed in the first user terminal 202 by requesting RRC connection re-establishment to the selected cell without going via the RRC_IDLE mode. In an exemplary embodiment, messages 406, 408, 413 sent between UE2 and eNB may include new or existing messages e.g. for reporting RLF or selected cell information of UE1, or messages 406, 408, 413 may include an extension of existing messages such as measurement reports and/or RRC reconfiguration messages.

Figure 5:
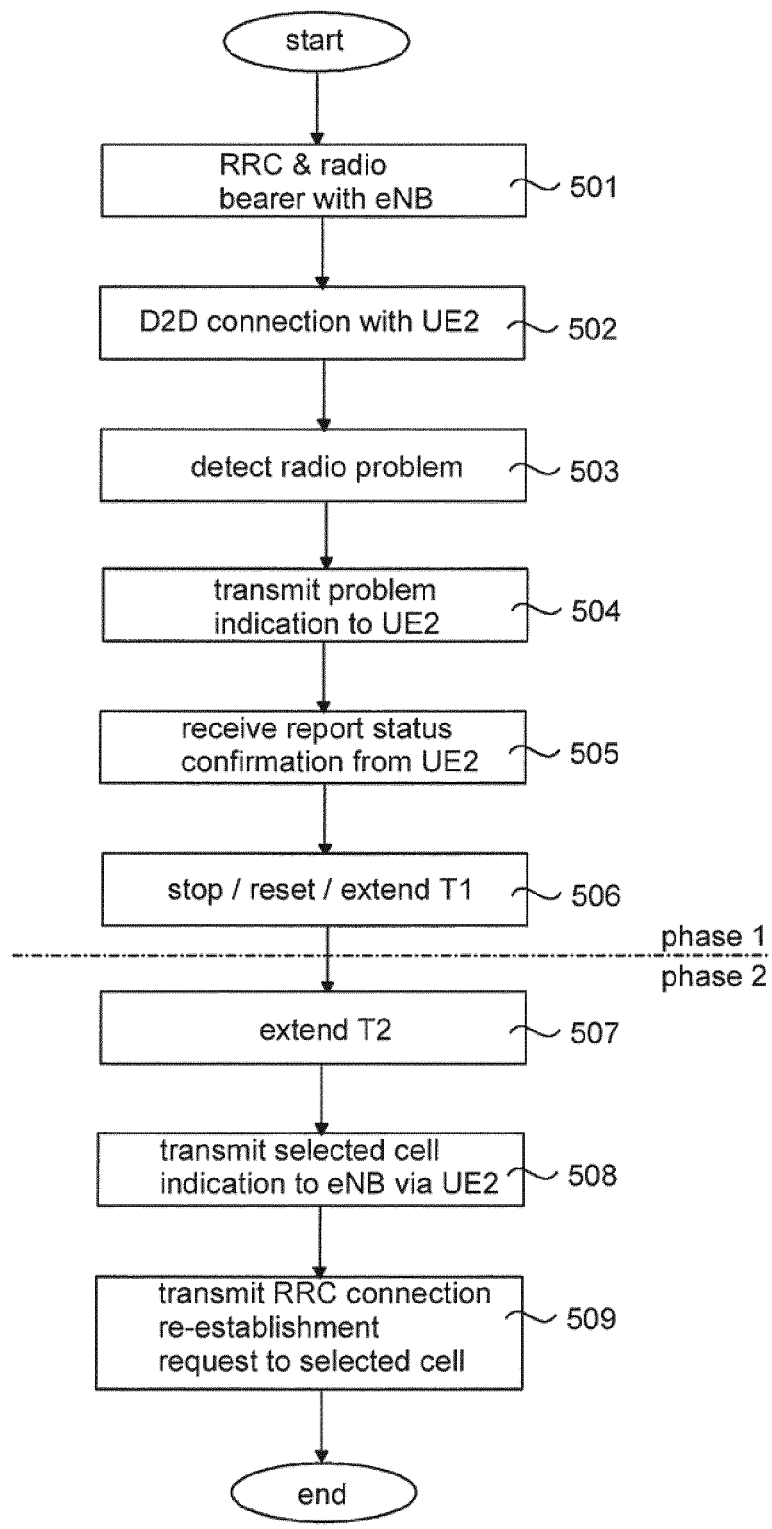
FIG. 5 shows a schematic diagram of a flow chart according to an exemplary embodiment of the invention.

FIG. 5 is a flow chart illustrating an exemplary embodiment. The apparatus 202, which may comprise e.g. a first user equipment 202 located in the service area of a radio network node 201, may have established RRC and radio bearer with the radio network node 201 (which may comprise e.g. a LTE-capable base station (enhanced node-B, eNB)) in item 501. In item 502, a device-to-device link may have been established between the first user terminal 202 and a second user terminal UE2 203. In item 503, a radio link problem may be detected in the first user terminal 202. In response to the detecting 503, in the first user terminal, the radio link problem during a first phase of a radio link failure, an indication may be transmitted, in item 504, on the detection of the radio link problem from the first user terminal 202 to the second user terminal 203 over the device-to-device link. In item 505, the first user terminal 202 may receive a confirmation on a status of the report on the radio link problem detection from the second user terminal 203. In item 506, based on the confirmation, the first user terminal 202 may decide, whether to stop a first radio link failure timer, reset the first radio link failure timer or extend the first radio link failure timer (and act according to the decision). In item 507, the first user terminal 202 may extend, during a second phase of a radio link failure, a second radio link failure timer, if a device-to-device link is available for UE1 for assisting radio link failure recovery when the first user terminal 202 detects the radio link failure. In item 508, the first user terminal 202 may indicate, via UE2 203, a selected cell to the network apparatus 201 in order the network to be able to prepare the selected cell for first user terminal's access, wherein when the first user terminal 202 selects a cell of a different network apparatus after the radio failure is detected, the first user terminal 202 may indicate to the network, via the second user terminal 203, a cell identifier of the selected cell and a cell identifier of the cell serving the first user terminal 202 before the radio link failure happened. In item 509, the first user terminal 202 may recover from the radio link failure, wherein activity is resumed in the first user terminal 202 by requesting RRC connection re-establishment to the selected cell without going via the RRC_IDLE mode.

Figure 6:
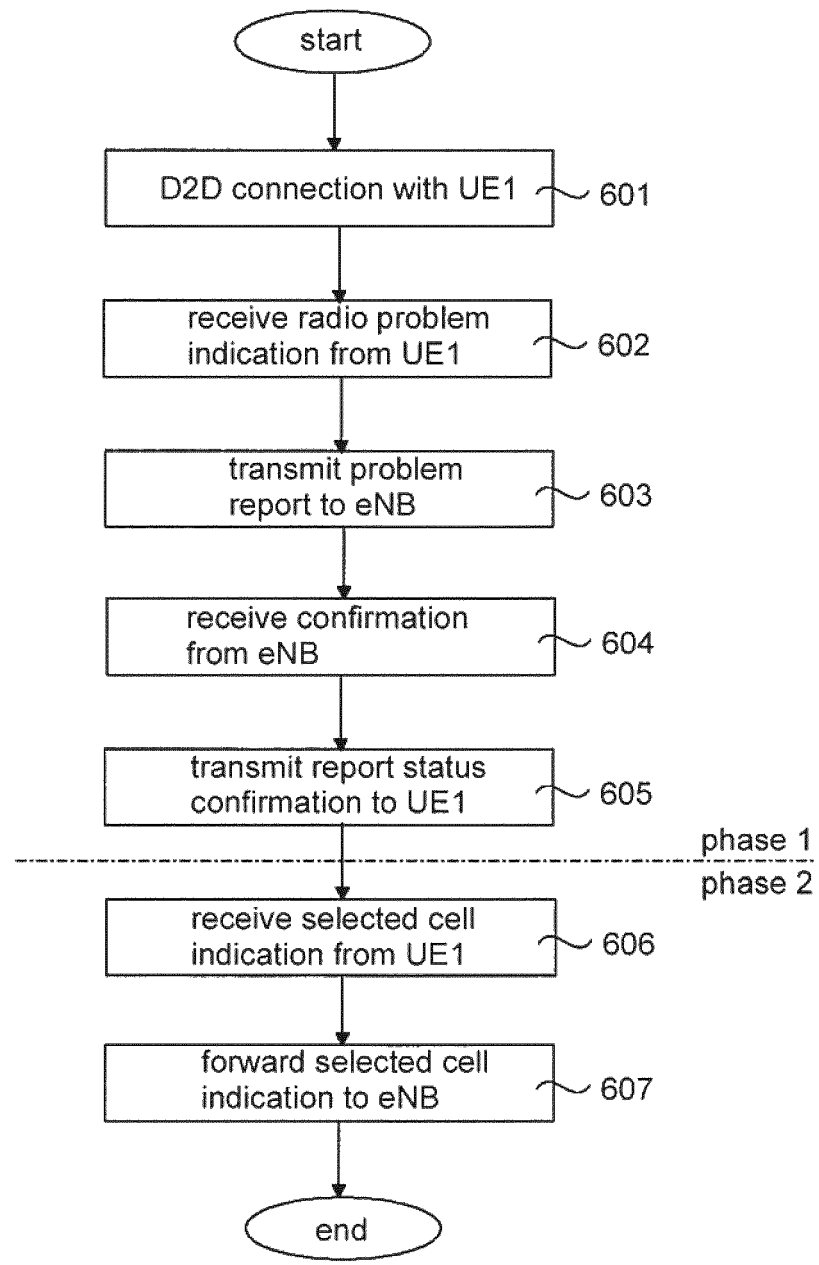
FIG. 6 shows a schematic diagram of a flow chart according to an exemplary embodiment of the invention.

FIG. 6 is a flow chart illustrating an exemplary embodiment. The apparatus 203, which may comprise e.g. a second user equipment 203 located in the service area of a radio network node 201, may, in item 601, have established a device-to-device link between a first user terminal 202 and the second user terminal 203. In item 602, the apparatus 203 may receive an indication of detection of a radio link problem from a first user terminal 202 over the device-to-device link, the indication indicating a cellular radio link problem detected in the first user terminal 202 during a first phase of a radio link failure. In item 603, the second user terminal 203 may transmit, to the network apparatus 201, a report on the radio link problem detection of the first user terminal, in order the network apparatus 201 to be able to proactively reduce the impact caused by the radio link problem of the first user terminal 202. In item 605, the second user terminal 203 may transmit, after sending 603 the report on the radio link problem detection of the first user terminal 202 to the network apparatus 201 and receiving, in item 604, a response/confirmation from the network apparatus 201, a confirmation on a status (e.g. whether the report on the radio link problem is successful or not) of the report to the first user terminal 202 in order the first user terminal 202 to be able to decide, based on the confirmation, whether to stop a first radio link failure timer, reset the first radio link failure timer or extend the first radio link failure timer. In item 603 UE2 reports the problem of UE1 to eNB, and, in item 604, eNB gives the response. Based on the response, UE2 knows if the report is successful or not; in the response 604, eNB may provide other information such as if it allows utilizing UE2 and the D2D link to provide temporary or alternative radio access connection to UE1. In item 606, the second user terminal 203 may receive an indication on a selected cell, transmitted from the first user terminal 202 to the network apparatus 201, in order the network to be able to prepare the selected cell for first user terminal's access, wherein when the first user terminal 202 selects a cell of a different network apparatus after the radio failure is detected, the first user terminal 202 may indicate to the network via the second user terminal 203 a cell identifier of the selected cell and a cell identifier of the cell serving the first user terminal 202 before the radio link failure happened. In item 607, the second user terminal 203 may forward the indication on the selected cell to the network apparatus 201 so that the network is able to prepare, the selected cell for the first user terminal's access in order the first user terminal 202 to be able to recover from radio link failure and resume activity by requesting RRC connection re-establishment to the selected cell without going via a RRC_IDLE mode.

Figure 7:
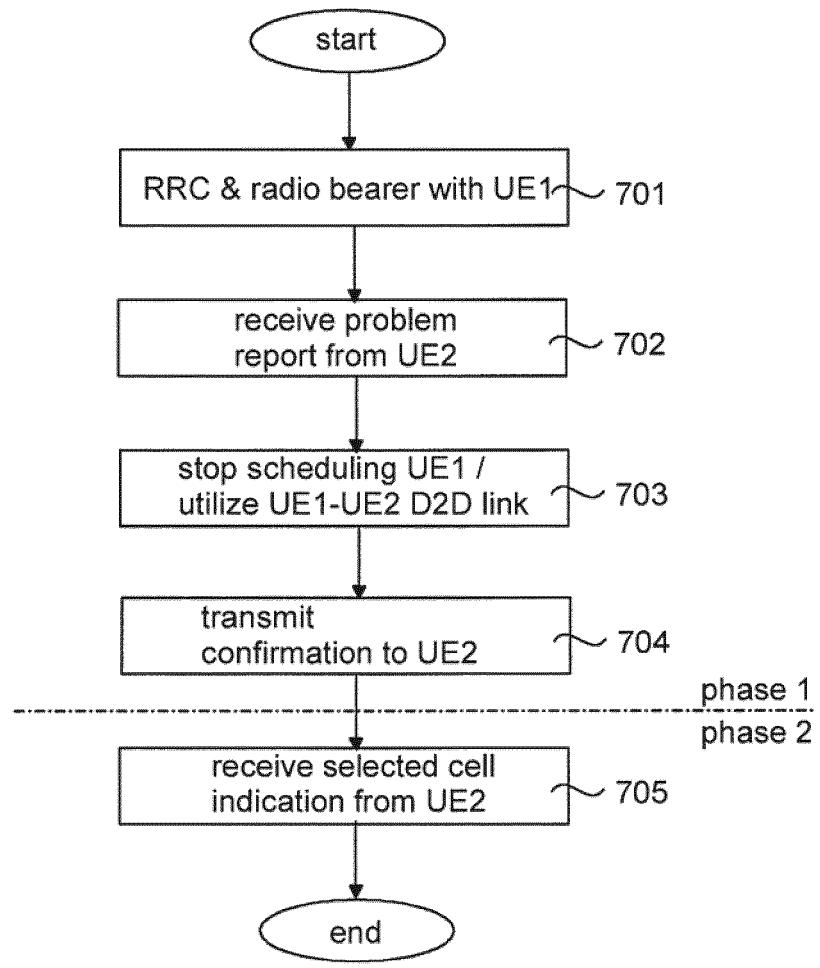
FIG. 7 shows a schematic diagram of a flow chart according to an exemplary embodiment of the invention.

FIG. 7 is a flow chart illustrating an exemplary embodiment. The apparatus 201, which may comprise e.g. a network element (network node, e.g. a LTE-capable base station (enhanced node-B, eNB) of a macro cell may have established RRC and radio bearer with a first user terminal 202 in item 701 (UE2 203 may use its own radio link to communication with eNB for UE1 202, or, if no direct link is available between UE2 and eNB, UE2 may use UE1's information (e.g. C-RNTI, scheduling grant) to communicate with eNB for UE1). In item 702, the network node 201 may receive, from the second user terminal 203, a report on a radio link problem detection of the first user terminal 202 during a first phase of a radio link failure, and based on that, proactively reduce 703 the impact caused by the radio link problem of the first user terminal 202, e.g. by stopping 703 downlink and uplink scheduling for the first user terminal 202, if radio problem recovery is not detected or indicated, and/or by utilizing 703 the device-to-device link for the first user terminal 202 via the second user terminal 203 for providing a temporary or alternative radio connection for the first user terminal 202. In item 704, the network apparatus 201 may transmit, to the second user terminal 203, a response/confirmation on a status of the report (e.g. whether the report on the radio link problem is successful or not). In item 705, the network apparatus 201 may receive from the second user terminal 203 an indication on a selected cell regarding the first user terminal 202, so that the network is able to prepare 705 the selected cell (e.g. by control signaling between the serving eNB 201 and the selected cell (eNB of the selected cell)) for the first user terminal's access in order the first user terminal 202 to be able to recover from radio link failure and resume activity by requesting RRC connection re-establishment to the selected cell without going via a RRC_IDLE mode.

The steps/points, signalling messages and related functions described above in FIGS. 1 to 7 are in no absolute chronological order, and some of the steps/points may be performed simultaneously or in an order differing from the given one. Other functions can also be executed between the steps/points or within the steps/points and other signalling messages sent between the illustrated messages. Some of the steps/points or part of the steps/points can also be left out or replaced by a corresponding step/point or part of the step/point. The apparatus operations illustrate a procedure that may be implemented in one or more physical or logical entities. The signalling messages are only exemplary and may even comprise several separate messages for transmitting the same information. In addition, the messages may also contain other information.

An exemplary embodiment relates to LTE-A (Rel-12+) and more particularly to handling link failures for user terminals having a D2D connection in LTE in order to optimize the radio link failure handling and recovery. An exemplary embodiment enables optimizing (e.g. for user terminals) the handling during the first phase of a link failure. A user terminal detecting a link failure indicates this via a D2D link to another (second) user terminal which in turn communicates with the controlling eNB of the user terminal that detected the failure as well as with the user terminal that has the link failure and its controlling eNB, in order to reduce the failure time. An exemplary embodiment discloses methods for extending the recovery time while the user terminal is experiencing a radio link failure and for minimizing the impact of RLF. An exemplary embodiment discloses extending expiration timers, asking another user terminal to inform eNB about RLF, asking another user terminal to send/receive data on its behalf, preparing the network to receive the user terminal.

Thus, according to an exemplary embodiment, there is provided a method for handling a radio link failure in a communications system, the method comprising in response to detecting (403), in a first user terminal (202), a radio link problem during a first phase of a radio link failure, transmitting (404) an indication of a detection of the radio link problem from the first user terminal (202) to a second user terminal (203) over a device-to-device link; receiving (410), in the first user terminal (202) from the second user terminal (203) over the device-to-device link, a confirmation (409) on a status of a report on the radio link problem detection of the first user terminal (202), the report (406) being sent from the second user terminal (203) to a network apparatus (201), the confirmation (409) on the status of the report being based on an acknowledgement (408) sent by the network apparatus to the second user terminal; based on the confirmation (409), deciding (410) in the first user terminal (202) whether to stop a first radio link failure timer, reset the first radio link failure timer or extend the first radio link failure timer; wherein the method further comprises indicating (412, 413) a selected cell to the network apparatus (201) in order the network to be able to prepare the selected cell for first user terminal's access, wherein when the first user terminal (202) selects a cell of a different network apparatus after the radio failure is detected, the first user terminal (202) indicates to the network via the second user terminal (203) a cell identifier of the selected cell and the cell serving the first user terminal before the radio link failure happens; recovering (415) the first user terminal (202) from the radio link failure, wherein activity is resumed in the first user terminal (202) by requesting RRC connection re-establishment to the selected cell without going via an RRC_IDLE mode.

According to another exemplary embodiment, there is provided a method comprising transmitting, from the first user terminal to a second user terminal over the device-to-device link, during the first phase of the radio link failure, information on a C-RNTI identifier of the first user terminal, a DRX configuration and uplink timing advance, in order the second user terminal to be able to monitor scheduling information and make uplink transmission on scheduled uplink resources using the timing advance information of the first user terminal.

According to yet another exemplary embodiment, there is provided a method comprising receiving, if it is configured in the network apparatus to use a direct radio link of the second user terminal to provide an alternative radio connection to the first user terminal as part of a quick radio link failure recovery within the first radio link failure timer, a confirmation on the direct link usage together with the confirmation on the status of the report, wherein the method comprises stopping, either semi-statically based on preconfigured rules or dynamically, the first radio link failure timer in the first user terminal, if the alternative radio connection to the first user terminal via the direct radio link of the second user terminal is configured, or resetting or extending the first radio link failure timer, if it is configured in the network apparatus to provide a temporary radio connection to the first user terminal.

According to yet another exemplary embodiment, there is provided a method comprising extending, in the first user terminal during a second phase of a radio link failure, a second radio link failure timer, if the device-to-device link is available for assisting radio link failure recovery when the first user terminal detects the radio link failure.

According to yet another exemplary embodiment, there is provided a method comprising executing, in the first user terminal during the second phase of the radio link failure, an extended second radio link failure timer, if the extended second radio link failure timer is autonomously executable in the first user terminal based on preconfigured rules received from a network.

According to yet another exemplary embodiment, if the first user terminal has user plane traffic over a direct device-to-device link and a control plane connection towards the network apparatus is only for network controlled device-to-device operation, the second radio link failure timer is extended till the time when next control command/request from/to the network is expected.

According to yet another exemplary embodiment, if it is configured in the network apparatus that at least some of the first user terminal's traffic is temporarily relayed via the second user terminal when the first user terminal detects a radio link failure, the second radio link failure timer is extended, or re-started for certain number of times, until reaching a preconfigured maximum limit.

According to yet another exemplary embodiment, if the first user terminal was relaying the second user terminal's traffic to/from the network apparatus by a device-to-device based mobile relay access before the radio link failure is detected and the network apparatus is able to configure to switch the relaying role to allow the second user terminal to relay the first user terminal's traffic to/from the network apparatus, the second radio link failure timer stops when the first user terminal has established an access link to the network apparatus via the second user terminal.

According to yet another exemplary embodiment, there is provided a first user terminal (202) comprising at least one processor; and at least one memory including a computer program code, wherein the at least one memory and the computer program code are configured to, with the at least one processor, cause the first user terminal (202) to transmit, in response to detecting a radio link problem during a first phase of a radio link failure, an indication of a detection of the radio link problem to a second user terminal (203) over a device-to-device link; receive, from the second user terminal (203) over the device-to-device link, a confirmation on a status of a report on the radio link problem detection of the first user terminal (202), the report being sent from the second user terminal (203) to a network apparatus (201), the confirmation on the status of the report being based on an acknowledgement sent by the network apparatus to the second user terminal; decide, based on the confirmation, whether to stop a first radio link failure timer, reset the first radio link failure timer or extend the first radio link failure timer; wherein the at least one memory and the computer program code are further configured to, with the at least one processor, cause the first user terminal (202) to indicate a selected cell to the network apparatus (201) in order the network to be able to prepare the selected cell for first user terminal's access, wherein when the first user terminal (202) selects a cell of a different network apparatus after the radio failure is detected, the first user terminal (202) indicates to the network via the second user terminal (203) a cell identifier of the selected cell and the cell serving the first user terminal (202) before the radio link failure happens; recover from the radio link failure, wherein activity is resumed in the first user terminal (202) by requesting RRC connection re-establishment to the selected cell without going via an RRC_IDLE mode.

According to yet another exemplary embodiment, the at least one memory and the computer program code are configured to, with the at least one processor, cause the first user terminal to transmit to a second user terminal over the device-to-device link, during the first phase of the radio link failure, information on a C-RNTI identifier of the first user terminal, a DRX configuration and uplink timing advance, in order the second user terminal to be able to monitor scheduling information and make uplink transmission on scheduled uplink resources using the timing advance information of the first user terminal.

According to yet another exemplary embodiment, the at least one memory and the computer program code are configured to, with the at least one processor, cause the first user terminal to receive, if it is configured in the network apparatus to use a direct radio link of the second user terminal to provide an alternative radio connection to the first user terminal as part of a quick radio link failure recovery within the first radio link failure timer, a confirmation on the direct link usage together with the confirmation on the status of the report, wherein the at least one memory and the computer program code are configured to, with the at least one processor, cause the first user terminal to stop, either semi-statically based on preconfigured rules or dynamically, the first radio link failure timer in the first user terminal, if the alternative radio connection to the first user terminal via the direct radio link of the second user terminal is configured, or reset or extend the first radio link failure timer, if it is configured in the network apparatus to provide a temporary radio connection to the first user terminal.

According to yet another exemplary embodiment, the at least one memory and the computer program code are configured to, with the at least one processor, cause the first user terminal to extend, in the first user terminal during a second phase of a radio link failure, a second radio link failure timer, if the device-to-device link is available for assisting radio link failure recovery when the first user terminal detects the radio link failure.

According to yet another exemplary embodiment, the at least one memory and the computer program code are configured to, with the at least one processor, cause the first user terminal to execute, in the first user terminal during the second phase of the radio link failure, an extended second radio link failure timer, if the extended second radio link failure timer is autonomously executable in the first user terminal based on preconfigured rules received from a network.

According to yet another exemplary embodiment, the at least one memory and the computer program code are configured to, with the at least one processor, cause the first user terminal to extend, if the first user terminal has user plane traffic over a direct device-to-device link and a control plane connection towards the network apparatus is only for network controlled device-to-device operation, the second radio link failure timer till the time when a next control command/request from/to the network is expected.

According to yet another exemplary embodiment, the at least one memory and the computer program code are configured to, with the at least one processor, cause the first user terminal to, if it is configured in the network apparatus that at least some of the first user terminal's traffic is temporarily relayed via the second user terminal when the first user terminal detects a radio link failure, extend the second radio link failure timer, or re-start the second radio link failure timer for certain number of times, until reaching a preconfigured maximum limit.

According to yet another exemplary embodiment, the at least one memory and the computer program code are configured to, with the at least one processor, cause the first user terminal to, if the first user terminal was relaying the second user terminal's traffic to/from the network apparatus by a device-to-device based mobile relay access before the radio link failure is detected and the network apparatus is able to configure to switch the relaying role to allow the second user terminal to relay the first user terminal's traffic to/from the network apparatus, stop the second radio link failure timer when the first user terminal has established an access link to the network apparatus via the second user terminal.

According to yet another exemplary embodiment, there is provided a second user terminal (203) comprising at least one processor; and at least one memory including a computer program code, wherein the at least one memory and the computer program code are configured to, with the at least one processor, cause the second user terminal (203) to receive an indication of a detection of the radio link problem from the first user terminal (202) over a device-to-device link, the indication indicating a radio link problem detected in the first user terminal (202) during a first phase of a radio link failure; transmit, to a network apparatus (201), a report on the radio link problem detection of the first user terminal (202), in order the network apparatus to be able to proactively reduce the impact caused by the radio link problem of the first user terminal (202); transmit, in response to the network apparatus acknowledging the report on the radio link problem detection of the first user terminal (202), a confirmation on a status of the report to the first user terminal (202) in order the first user terminal (202) to be able to decide, based on the confirmation, whether to stop a first radio link failure timer, reset the first radio link failure timer or extend the first radio link failure timer; wherein the at least one memory and the computer program code are further configured to, with the at least one processor, cause the second user terminal (203) to indicate to the network apparatus (201) a selected cell so that the network is able to prepare the selected cell for the first user terminal's access in order the first user terminal (202) to be able to recover from radio link failure and resume activity by requesting RRC connection re-establishment to the selected cell without going via a RRC_IDLE mode.

According to yet another exemplary embodiment, the at least one memory and the computer program code are configured to, with the at least one processor, cause the second user terminal to use its own connection to report the radio link problem of the first user terminal to the network apparatus.

According to yet another exemplary embodiment, the at least one memory and the computer program code are configured to, with the at least one processor, cause the second user terminal to monitor scheduling information on the first user terminal; and report the radio link problem of the first user terminal on the scheduled uplink resource, if uplink scheduling information targeted to the first user terminal is detected.

According to yet another exemplary embodiment, the at least one memory and the computer program code are configured to, with the at least one processor, cause the second user terminal to, if the second user terminal does not have a direct radio link towards the network apparatus, monitor the scheduling information of the first user terminal; and report the radio problem detection of the first user terminal to the network apparatus on the scheduled uplink resources using timing advance information on the first user terminal, if uplink scheduling information for the first user terminal is detected.

According to yet another exemplary embodiment, the at least one memory and the computer program code are configured to, with the at least one processor, cause the second user terminal to confirm to the first user terminal over the device-to-device link a possible quick recovery of the radio link problem during the first phase.

According to yet another exemplary embodiment, the at least one memory and the computer program code are configured to, with the at least one processor, cause the second user terminal to, if it is configured in the network apparatus to use a direct radio link of the second user terminal in order to provide an alternative radio connection to the first user terminal as part of a quick radio link failure recovery within the first radio link failure timer, transmit a confirmation on the direct link usage to the first user terminal together with the confirmation on the status of the report.

According to yet another exemplary embodiment, the at least one memory and the computer program code are configured to, with the at least one processor, cause the second user terminal to report, if the second user terminal has a direct radio link towards the network apparatus, the radio link failure of the first user terminal during the second phase of the radio link failure, wherein an extended second radio link failure timer is dynamically configured in the network apparatus and communicated to the first user terminal via the second user terminal.

According to yet another exemplary embodiment, there is provided an apparatus comprising at least one processor; and at least one memory including a computer program code, wherein the at least one memory and the computer program code are configured to, with the at least one processor, cause the apparatus to receive, from a second user terminal, a report on the radio link problem detection of the first user terminal during a first phase of a radio link failure; proactively reduce the impact caused by the radio link problem of the first user terminal by stopping link scheduling for the first user terminal before radio problem recovery is detected or indicated, and/or by utilizing a device-to-device link for the first user terminal via the second user terminal for providing a temporary or alternative radio connection for the first user terminal.

According to yet another exemplary embodiment, the at least one memory and the computer program code are configured to, with the at least one processor, cause the apparatus to receive, from the first user terminal (202) via the second user terminal (203), an indication on a selected cell in order the network to be able to prepare the selected cell for first user terminal's access, wherein a cell of a different network apparatus is selected by the first user terminal (202) after the radio failure is detected, the indication indicating a cell identifier of the selected cell and the cell serving the first user terminal (202) before the radio link failure happens.

According to yet another exemplary embodiment, there is provided a computer program product comprising program code means configured to perform any of the method steps when the program is run on a computer.

According to yet another exemplary embodiment, there is provided a computer-readable storage medium comprising program code means configured to perform any of the method steps when executed on a computer.

It will be obvious to a person skilled in the art that, as the technology advances, the inventive concept can be implemented in various ways. The invention and its embodiments are not limited to the examples described above but may vary within the scope of the claims.

LIST OF ABBREVIATIONS

D2D device-to-device
DRX discontinuous reception
RLF radio link failure
UE user equipment
LTE long term evolution
LTE-A long term evolution-advanced
C-RNTI cell radio network temporary identifier
Rel-12 release-12
UMTS universal mobile telecommunications system
GSM global system for mobile communications
EDGE enhanced data rates for global evolution
WCDMA wideband code division multiple access
WLAN wireless local area network
3GPP $3^{rd}$ generation partnership project

The invention claimed is:

1. A method for handling a radio link failure in a communications system, the method comprising:
in response to detecting, in a first user terminal, a radio link problem during a first phase of a radio link failure, transmitting an indication of a detection of the radio link problem from the first user terminal to a second user terminal over a device-to-device link;
receiving, in the first user terminal from the second user terminal over the device-to-device link, a confirmation on a status of a report on the radio link problem detection of the first user terminal, the report being sent from the second user terminal to a network apparatus, the confirmation on the status of the report being based on an acknowledgement sent by the network apparatus to the second user terminal;

based on the confirmation, deciding in the first user terminal whether to stop a first radio link failure timer, reset the first radio link failure timer or extend the first radio link failure timer;

wherein the method further comprises:

indicating a selected cell to the network apparatus in order the network to be able to prepare the selected cell for first user terminal's access, wherein when the first user terminal selects a cell of a different network apparatus after the radio failure is detected, the first user terminal indicates to the network via the second user terminal a cell identifier of the selected cell and the cell serving the first user terminal before the radio link failure happens; and recovering the first user terminal from the radio link failure, wherein activity is resumed in the first user terminal by requesting RRC connection re-establishment to the selected cell without going via an RRC_IDLE mode.

2. A method according to claim 1, and further comprising transmitting, from the first user terminal to a second user terminal over the device-to-device link, during the first phase of the radio link failure, information on a C-RNTI identifier of the first user terminal, a DRX configuration and uplink timing advance, in order the second user terminal to be able to monitor scheduling information and make uplink transmission on scheduled uplink re-sources using the timing advance information of the first user terminal.

3. A method according to claim 1, comprising receiving, if it is configured in the network apparatus to use a direct radio link of the second user terminal to provide an alternative radio connection to the first user terminal as part of a quick radio link failure recovery within the first radio link failure timer, a confirmation on the direct link usage together with the confirmation on the status of the report, wherein the method further comprises at least one of the following:

stopping, either semi-statically based on preconfigured rules or dynamically, the first radio link failure timer in the first user terminal, if the alternative radio connection to the first user terminal via the direct radio link of the second user terminal is configured; and resetting or extending the first radio link failure timer, if it is configured in the network apparatus to provide a temporary radio connection to the first user terminal.

4. A method according to claim 1, comprising extending, in the first user terminal during a second phase of a radio link failure, a second radio link failure timer, if the device-to-device link is available for assisting radio link failure recovery when the first user terminal detects the radio link failure.

5. A method according to claim 1, comprising executing, in the first user terminal during a second phase of the radio link failure, an extended second radio link failure timer, if the extended second radio link failure timer is autonomously executable in the first user terminal based on preconfigured rules received from a network.

6. A method according to claim 4, comprising, if the first user terminal has user plane traffic over a direct device-to-device link and a control plane connection towards the network apparatus is only for network controlled device-to-device operation, the second radio link failure timer is extended until the time when next control command/request from/to the network is expected.

7. A method according to claim 4, comprising, if it is configured in the network apparatus that at least some of the first user terminal's traffic is temporarily relayed via the second user terminal when the first user terminal detects a radio link failure, the second radio link failure timer is extended, or re-started for certain number of times, until reaching a preconfigured maximum limit.

8. A method according to claim 4, comprising, if the first user terminal was relaying the second user terminal's traffic to/from the network apparatus by a device-to-device based mobile relay access before the radio link failure is detected and the network apparatus is able to configure to switch the relaying role to allow the second user terminal to relay the first user terminal's traffic to/from the network apparatus, the second radio link failure timer stops when the first user terminal has established an access link to the network apparatus via the second user terminal.

9. A first user terminal comprising at least one processor and at least one memory including a computer program code, wherein the at least one memory and the computer program code are configured to, with the at least one processor, cause the first user terminal to:

transmit, in response to detecting a radio link problem during a first phase of a radio link failure, an indication of a detection of the radio link problem to a second user terminal over a device-to-device link;

receive, from the second user terminal over the device-to-device link, a confirmation on a status of a report on the radio link problem detection of the first user terminal, the report being sent from the second user terminal to a network apparatus, the confirmation on the status of the report being based on an acknowledgement sent by the network apparatus to the second user terminal;

decide, based on the confirmation, whether to stop a first radio link failure timer, reset the first radio link failure timer or extend the first radio link failure timer;

wherein the at least one memory and the computer program code are further con-figured to, with the at least one processor, cause the first user terminal to:

indicate a selected cell to the network apparatus in order the network to be able to prepare the selected cell for first user terminal's access, wherein when the first user terminal selects a cell of a different network apparatus after the radio failure is detected, the first user terminal indicates to the network via the second user terminal a cell identifier of the selected cell and the cell serving the first user terminal before the radio link failure happens; and recover from the radio link failure, wherein activity is resumed in the first user terminal by requesting RRC connection re-establishment to the selected cell without going via an RRC_IDLE mode.

10. A first user terminal according to claim 9, wherein the at least one memory and the computer program code are configured to, with the at least one processor, cause the first user terminal to transmit to a second user terminal over the device-to-device link, during the first phase of the radio link failure, information on a C-RNTI identifier of the first user terminal, a DRX configuration and uplink timing advance, in order the second user terminal to be able to monitor scheduling information and make uplink transmission on scheduled uplink resources using the timing advance information of the first user terminal.

11. A first user terminal according to claim 9, wherein the at least one memory and the computer program code are configured to, with the at least one processor, cause the first user terminal to receive, if it is configured in the network apparatus to use a direct radio link of the second user terminal to provide an alternative radio connection to the first user terminal as part of a quick radio link failure recovery within the first radio link failure timer, a confirmation on the direct link usage together with the confirmation on the status of the report, wherein the at least one memory and the computer program code are configured to, with the at least one processor, further cause the first user terminal to perform at least one of the following:

stop, either semi-statically based on preconfigured rules or dynamically, the first radio link failure timer in the first user terminal, if the alternative radio connection to the first user terminal via the direct radio link of the second user terminal is configured; and reset or extend the first radio link failure timer, if it is configured in the network apparatus to provide a temporary radio connection to the first user terminal.

12. A first user terminal according to claim 9, wherein the at least one memory and the computer program code are configured to, with the at least one processor, cause the first user terminal to extend, in the first user terminal during a second phase of a radio link failure, a second radio link failure timer, if the device-to-device link is available for assisting radio link failure recovery when the first user terminal detects the radio link failure.

13. A second user terminal comprising at least one processor and at least one memory including a computer program code, wherein the at least one memory and the computer program code are configured to, with the at least one processor, cause the second user terminal to:

receive an indication of a detection of the radio link problem from the first user terminal over a device-to-device link, the indication indicating a radio link problem detected in the first user terminal during a first phase of a radio link failure;

transmit, to a network apparatus, a report on the radio link problem detection of the first user terminal, in order the network apparatus to be able to proactively reduce the impact caused by the radio link problem of the first user terminal;

transmit, in response to the network apparatus acknowledging the report on the radio link problem detection of the first user terminal, a confirmation on a status of the report to the first user terminal in order the first user terminal to be able to decide, based on the confirmation, whether to stop a first radio link failure timer, reset the first radio link failure timer or extend the first radio link failure timer;

wherein the at least one memory and the computer program code are further con-figured to, with the at least one processor, cause the second user terminal to indicate to the network apparatus a selected cell so that the network is able to prepare the selected cell for the first user terminal's access in order the first user terminal to be able to recover from radio link failure and resume activity by requesting RRC connection re-establishment to the selected cell without going via a RRC_IDLE mode.

14. A second user terminal according to claim 13, wherein the at least one memory and the computer program code are configured to, with the at least one processor, cause the second user terminal to use its own connection to report the radio link problem of the first user terminal to the network apparatus.

15. A second user terminal according to claim 13, wherein the at least one memory and the computer program code are configured to, with the at least one processor, cause the second user terminal to:

monitor scheduling information on the first user terminal; and report the radio link problem of the first user terminal on the scheduled uplink resource, if uplink scheduling information targeted to the first user terminal is detected.

16. A second user terminal according to claim 13, wherein the at least one memory and the computer program code are configured to, with the at least one processor, cause the second user terminal to, if the second user terminal does not have a direct radio link towards the network apparatus:

monitor the scheduling information of the first user terminal; and report the radio problem detection of the first user terminal to the network apparatus on the scheduled uplink resources using timing advance information on the first user terminal, if uplink scheduling information for the first user terminal is detected.

17. A second user terminal according to any of claim 13, wherein the at least one memory and the computer program code are configured to, with the at least one processor, cause the second user terminal to confirm to the first user terminal over the device-to-device link a possible quick recovery of the radio link problem during the first phase.

18. A second user terminal according to claim 13, wherein the at least one memory and the computer program code are configured to, with the at least one processor, cause the second user terminal to, if it is configured in the network apparatus to use a direct radio link of the second user terminal in order to provide an alternative radio connection to the first user terminal as part of a quick radio link failure recovery within the first radio link failure timer, transmit a confirmation on the direct link usage to the first user terminal together with the confirmation on the status of the report.

19. A second user terminal according to claim 13, wherein the at least one memory and the computer program code are configured to, with the at least one processor, cause the second user terminal to report, if the second user terminal has a direct radio link towards the network apparatus, the radio link failure of the first user terminal during a second phase of the radio link failure, wherein an extended second radio link failure timer is dynamically configured in the network apparatus and communicated to the first user terminal via the second user terminal.

\* \* \* \* \*

UNITED STATES PATENT AND TRADEMARK OFFICE
CERTIFICATE OF CORRECTION

| | | |
|---|---|---|
| PATENT NO. | : 9,723,647 B2 | Page 1 of 1 |
| APPLICATION NO. | : 14/763053 | |
| DATED | : August 1, 2017 | |
| INVENTOR(S) | : Yu et al. | |

It is certified that error appears in the above-identified patent and that said Letters Patent is hereby corrected as shown below:

In Column 20, Line 37, Claim 9, delete "con-figured" and insert -- configured --, therefor.

In Column 21, Line 49, Claim 13, delete "con-figured" and insert -- configured --, therefor.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*